T. R. SINCLAIRE.
Car Starter.
No. 51,626. Patented Dec. 19, 1865.
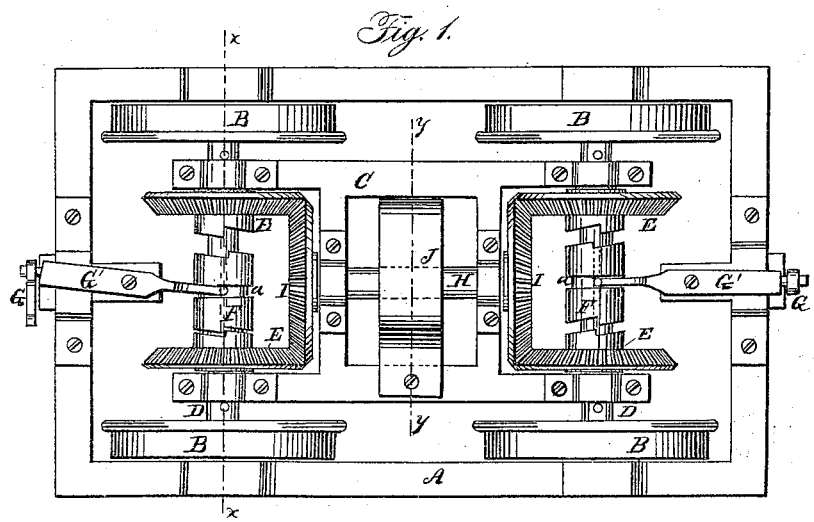
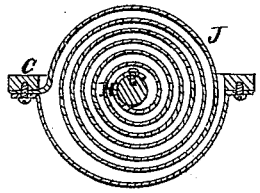
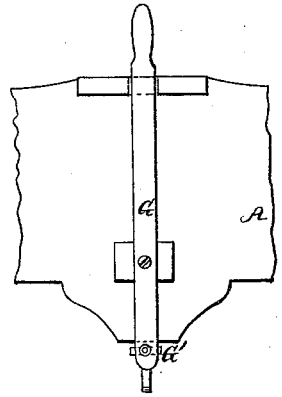
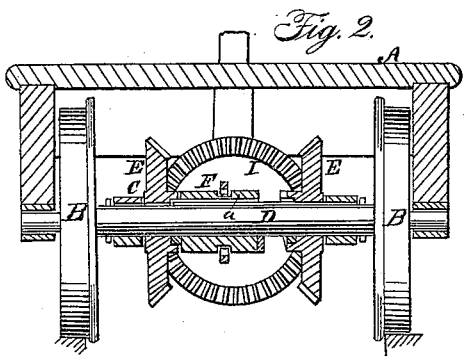
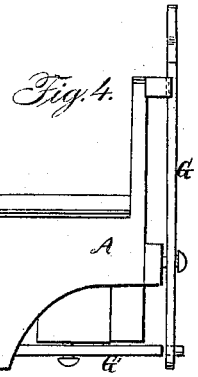
Witnesses:
Inventor:

UNITED STATES PATENT OFFICE.

THOMAS R. SINCLAIRE, OF NEW YORK, N. Y.

IMPROVEMENT IN MODE OF STARTING RAILROAD-CARS.

Specification forming part of Letters Patent No. 51,626, dated December 19, 1865.

*To all whom it may concern:*

Be it known that I, THOMAS R. SINCLAIRE, of the city, county, and State of New York, have invented a new and useful Combination of a Starter and Brake for Railroad-Cars and other Wheel Vehicles; and I do hereby declare that the following is a full, clear, and exact description thereof, which will enable those skilled in the art to make and use the same, reference being had to the accompanying drawings, forming part of this specification, in which—

Figure 1 is an inverted plan of a car-truck having my invention applied to it; Fig. 2, a transverse vertical section of the same, taken in the line $x\ x$, Fig. 1; Fig. 3, a transverse vertical section of a portion of the same, taken in the line $y\ y$, Fig. 1; Fig. 4, a side view of a portion of the same; Fig. 5, an end view of a portion of the same.

Similar letters of reference indicate corresponding parts.

This invention relates to a new and useful device to be applied to railroad-cars and other wheel vehicles, to serve as a brake, and also to assist the vehicle in starting, the parts being arranged in such a manner that the impetus or momentum of the vehicle, when the device is applied as a brake to stop the vehicle, will be husbanded or stored up and made to apply itself to the vehicle as a motor in starting the same.

The invention is more especially designed for street or horse railroad cars and to relieve the horses in starting them. Street-cars are generally constructed to carry a large number of passengers, and a team can draw a great number when the car is fairly under way. The great difficulty occurs in starting, and as cars of this class are necessarily stopped at very short intervals, in order to take in and let out passengers, any means which can relieve the team or assist it in starting the car will not only effect a saving as regards the labor of the team, but will also greatly expedite the progress of the car on its route.

A represents a car-truck, and B the wheels thereof. These parts may be constructed in the usual manner, and therefore do not require a minute description.

C represents a horizontal frame, which supports the principal part of the mechanism constituting my invention. This frame is secured to or fitted upon the axles D D of the wheels B, the axles being allowed to turn freely in the frame.

On each axle D there are fitted loosely two bevel-gears, E E, and a clutch, F, the clutches being allowed to slide on the axles between the gears, so that either of the latter may be connected with or disconnected from its axle. These clutches are actuated by levers G G′, the former, G, extending upward at the ends of the platform of the car within convenient reach of the driver, and the latter, G′, being at the under side of the truck A, their inner ends forked and fitted in a groove, $a$, made circumferentially in the clutches, and their outer ends connected to the lower ends of the levers G. (See more particularly Figs. 1 and 4.)

H is a shaft, which is placed in the frame C longitudinally, and has a bevel-gear, I, keyed upon it at each end, the gears I being between and meshing into the gears E E on the axles D, as shown clearly in Fig. 1.

J is a coil-spring, one end of which is attached to the shaft H, and the opposite end attached to the frame C, as shown in Fig. 3.

The operation is as follows: When the clutches F are disconnected from the gears E E on the axles D the car may be drawn along as usual, as there will be nothing to impede its progress. When it is necessary to apply the brake or to stop the car, the lever G in front of the platform on which the driver stands is actuated so as to throw the clutch F, which is connected with said lever, in contact with the gear E, which will turn the shaft H in the direction to wind up the spring J. This winding up of the spring will be done by the momentum of the car principally, as the team, of course, will be checked or reined in simultaneously with the actuating of the lever G. The resistance offered by the spring J serves as a brake.

In starting the car the driver actuates the lever G, so as throw the clutch F in connection with the other wheel, E, and the spring J will expend itself in starting the car.

I design to have the lever G′ at one end of the car constructed with a joint, so as to admit of the levers G at both ends of the car being moved in the same direction, in order to effect the result herein described. This would be preferable, as a driver, in consequence of the levers being moved in the same direction at both ends of the car, in order to effect the same result, would not be liable to err in regard to the direction in which the levers G should be moved in order to wind up the spring or allow it to expend itself in starting the car.

This invention may be applied to railroad-cars at a reasonable cost. There are no parts liable to get out of repair or become deranged by use, and it will effect a saving both in the labor of horses and in time.

Having thus described my invention, I claim as new and desire to secure by Letters Patent—

1. The arrangement of a single spring, connected by the shaft and gearing with the axles of the wheels, to operate in the manner substantially as and for the purpose set forth.

2. The sliding clutch F, in connection with the gears E I, when arranged with a spring or springs, J, substantially as and for the purpose specified.

3. The levers G G', connected with the clutches F and applied to the truck, substantially as described, when used in connection with the gearing and spring or springs, as and for the purpose set forth.

THOS. R. SINCLAIRE.

Witnesses:
M. M. LIVINGSTON,
C. L. TOPLIFF.